US012567616B2

(12) United States Patent
Xiong et al.

(10) Patent No.: US 12,567,616 B2
(45) Date of Patent: Mar. 3, 2026

(54) METHOD FOR CONTROLLING HEATING OF BATTERY PACK, COMPUTATIONAL PROCESSING DEVICE, AND NON-TRANSITORY COMPUTER READABLE STORAGE MEDIUM

(71) Applicant: GREAT WALL MOTOR COMPANY LIMITED, Baoding (CN)

(72) Inventors: Liang Xiong, Baoding (CN); Zhe Jiang, Baoding (CN); Yongluan Zhang, Baoding (CN); Xinran Dong, Baoding (CN); Guowei Song, Baoding (CN); Meng Liu, Baoding (CN); Pingyuan Luo, Baoding (CN); Yushan Li, Baoding (CN); Zelin Gao, Baoding (CN); Yadong Wang, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 744 days.

(21) Appl. No.: 17/790,296

(22) PCT Filed: Apr. 22, 2021

(86) PCT No.: PCT/CN2021/089028
§ 371 (c)(1),
(2) Date: Jun. 30, 2022

(87) PCT Pub. No.: WO2021/213472
PCT Pub. Date: Oct. 28, 2021

(65) Prior Publication Data
US 2023/0041744 A1 Feb. 9, 2023

(30) Foreign Application Priority Data
Apr. 22, 2020 (CN) .......................... 202010320294.1

(51) Int. Cl.
*H01M 10/615* (2014.01)
*H01M 10/625* (2014.01)
(Continued)

(52) U.S. Cl.
CPC ....... *H01M 10/615* (2015.04); *H01M 10/625* (2015.04); *H01M 10/63* (2015.04); *H01M 10/657* (2015.04); *H01M 10/66* (2015.04)

(58) Field of Classification Search
CPC ... B60L 58/27; H01M 10/615; H01M 10/625; H01M 10/63; H01M 10/657; H01M 10/66
See application file for complete search history.

(56) References Cited

U.S. PATENT DOCUMENTS 6,163,135 A 12/2000 Nakayama et al.
2012/0200241 A1 8/2012 Kojima et al.
(Continued)

FOREIGN PATENT DOCUMENTS

CN 103560304 A 2/2014
CN 103916996 A 7/2014
(Continued)

OTHER PUBLICATIONS

CN 111865185 English Translation (Year: 2020).*
(Continued)

*Primary Examiner* — Jimmy Vo
(74) *Attorney, Agent, or Firm* — Nath, Goldberg & Meyer; Joshua B. Goldberg

(57) ABSTRACT
A method for controlling heating of a battery pack is provided, in which, the method includes: acquiring a temperature of the battery pack; and controlling a motor controller to output a current to a motor, if the temperature of the battery pack is lower than a preset temperature threshold, so as to generate a magnetic field in the motor having a
(Continued)

acquiring a temperature of the battery pack

S101 controlling a motor controller to output a current to a motor, if the temperature of the battery pack is lower than a preset temperature threshold, so as to generate a magnetic field in the motor having a magnetic pole direction consistent with or opposite to a magnetic pole direction of a motor rotor and to enable the motor to maintain a stationary state

S102 magnetic pole direction consistent with or opposite to a magnetic pole direction of a motor rotor and to enable the motor to maintain a stationary state.

6 Claims, 6 Drawing Sheets

(51) Int. Cl.
H01M 10/63 (2014.01)
H01M 10/657 (2014.01)
H01M 10/66 (2014.01)

(56) References Cited

U.S. PATENT DOCUMENTS

| | | | |
|---|---|---|---|
| 2016/0133998 A1 | 5/2016 | Masias | |
| 2017/0267195 A1 | 9/2017 | Liu et al. | |
| 2017/0373359 A1 | 12/2017 | Krull et al. | |
| 2018/0083509 A1 | 3/2018 | Yang et al. | |

FOREIGN PATENT DOCUMENTS

| | | | | | |
|---|---|---|---|---|---|
| CN | 105762434 A | | 7/2016 | | |
| CN | 107546439 A | | 1/2018 | | |
| CN | 108501746 A | | 9/2018 | | |
| CN | 110048192 A | * | 7/2019 | .......... | H01M 10/615 |
| CN | 110329112 A | | 10/2019 | | |
| CN | 111016696 A | | 4/2020 | | |
| CN | 111865185 A | * | 10/2020 | .............. | B60K 1/00 |
| DE | 102014011828 A1 | | 2/2016 | | |
| JP | 2001197607 A | | 7/2001 | | |
| KR | 20120071074 A | | 7/2012 | | |
| KR | 20160036203 A | | 4/2016 | | |
| WO | 2013174281 A1 | | 11/2013 | | |
| WO | 2014024490 A1 | | 2/2014 | | |
| WO | 2017154256 A1 | | 9/2017 | | |

OTHER PUBLICATIONS

CN 110048192 English Translation (Year: 2019).*
Wang, et al.; "Research of a new brake energy recovery system of the light electric car"; Journal of Jiangsu University of Science and technology (Natural Science Edition), vol. 27 No. 2, Apr. 2013.
Zhang, et al.; "Research Progress in Integrated Thermal Management of Electric Vehicles", Geely Automobile Research Institute (Ningbo) Co., Ltd., Zhejiang Ningbo 315336.
Extended European Search Report dated Jan. 4, 2023 corresponding to application No. 21791719.4-1211.

* cited by examiner

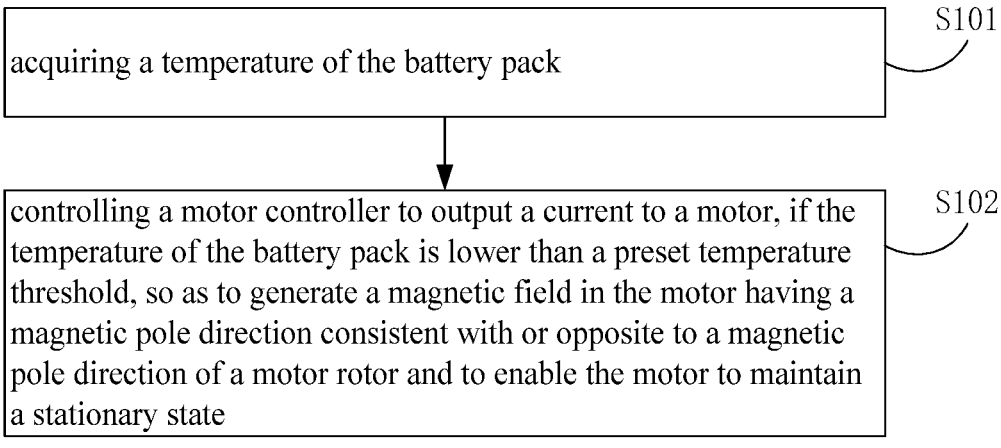

acquiring a temperature of the battery pack    S101 controlling a motor controller to output a current to a motor, if the temperature of the battery pack is lower than a preset temperature threshold, so as to generate a magnetic field in the motor having a magnetic pole direction consistent with or opposite to a magnetic pole direction of a motor rotor and to enable the motor to maintain a stationary state    S102

FIG. 1

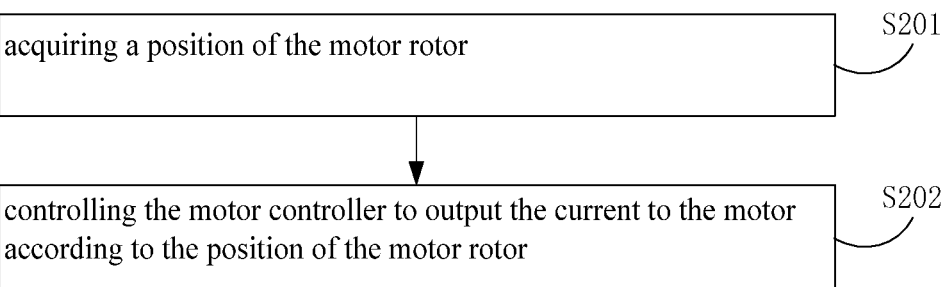

acquiring a position of the motor rotor    S201 controlling the motor controller to output the current to the motor according to the position of the motor rotor    S202

FIG. 2 magnetic pole of
motor winding magnetic pole of
motor rotor

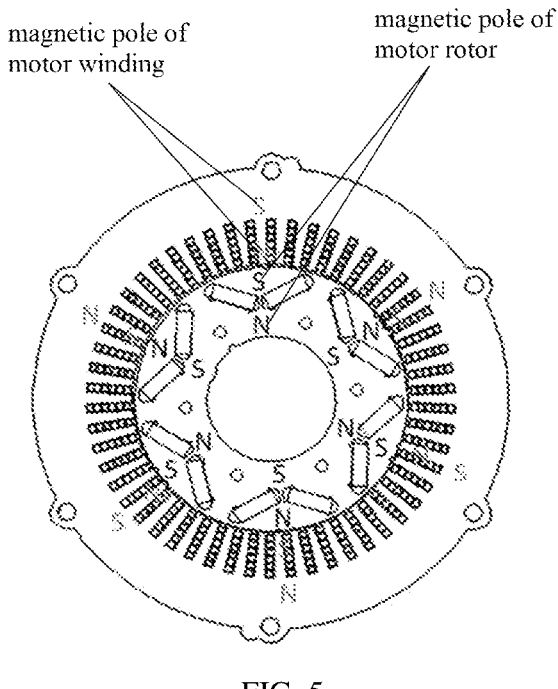

FIG. 5 acquiring a charge/discharge function state of the battery pack, a state
of the motor controller, and a state of the motor     S301 determining whether the charge/discharge
function state of the battery pack, a state of the motor
controller, and a state of the motor are all normal     S302

Y     N

S303     controlling the MCU to output
the current to the motor controlling the MCU to not
output the current to the motor     S304

FIG. 6

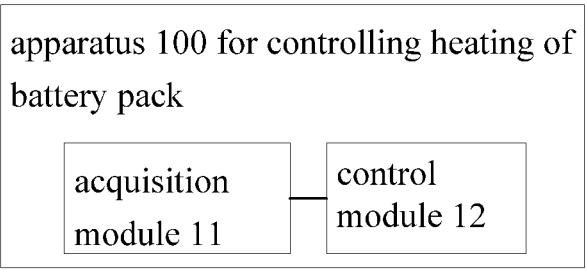
FIG. 8
vehicle controller 200
apparatus 100 for controlling heating of battery pack
FIG. 9
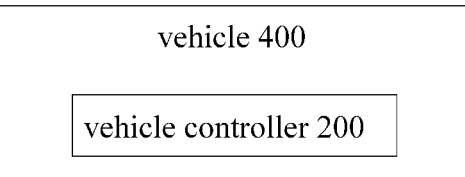
FIG. 10

METHOD FOR CONTROLLING HEATING OF BATTERY PACK, COMPUTATIONAL PROCESSING DEVICE, AND NON-TRANSITORY COMPUTER READABLE STORAGE MEDIUM

CROSS-REFERENCE TO RELATED APPLICATIONS

This is a National Phase application filed under 35 U.S.C. 371 as a national stage of No. PCT/CN2021/089028 with an international filing date of Apr. 22, 2021, designating the U.S., now pending, and further claims priority benefits to Chinese Patent Application No. 202010320294.1 filed Apr. 22, 2020. The contents of all of the aforementioned applications, including any intervening amendments thereto, are incorporated herein by reference.

TECHNICAL FIELD

The present disclosure relates to the field of vehicle control technology, and more particularly to a method and an apparatus for controlling heating of a battery pack, and a vehicle controller.

BACKGROUND

At present, in order to solve the problem of global oil shortage and urban air pollution, new energy vehicle including hybrid and pure electric technologies is booming. New energy vehicle adopts a power battery (that is, a battery pack) to provide a power source, and drives the motor, which in turn drives the vehicle forward.

However, the battery pack, as a main power source of the new energy vehicle, has strict requirements on the working temperature due to its own characteristics. In particular, when the temperature is extremely low, the discharge capacity, working efficiency, and lifespan of the power battery will be greatly affected.

Therefore, it is an urgent problem to be solve how to heat the battery pack to ensure that the temperature of the battery pack is within the allowable range.

SUMMARY

Embodiments of the present disclosure aims at solving one of technical problems of related technology at least to some extent.

Thus, it is a first objective of embodiments of the present disclosure to provide a method for controlling heating of a battery pack, so as to solve the technical problem in the existing technology of poor working status and lower discharge efficiency of the battery pack caused by too low the working temperature of the battery pack.

It is a second objective of embodiments of the present disclosure to provide an apparatus for controlling heating of a battery pack.

It is a third objective of embodiments of the present disclosure to provide a vehicle controller.

It is a third objective of embodiments of the present disclosure to provide a vehicle.

To achieve the above objectives, embodiments of a first aspect of the present disclosure provides a method for controlling heating a battery pack. The method comprises: acquiring a temperature of the battery pack; and controlling a motor controller to output a current to a motor, if the temperature of the battery pack is lower than a preset temperature threshold, so as to generate a magnetic field in the motor having a magnetic pole direction consistent with or opposite to a magnetic pole direction of a motor rotor and to enable the motor to maintain a stationary state.

According to an embodiment of the present disclosure, the method further comprises: controlling the motor controller to stop outputting the current to the motor, if the temperature of the battery pack is equal to or higher than the preset temperature threshold.

According to an embodiment of the present disclosure, the method further comprises: acquiring a position of the motor rotor; and controlling the motor controller to output the current to the motor according to the position of the motor rotor.

According to an embodiment of the present disclosure, the method further comprises: acquiring a charge/discharge function state of the battery pack, a state of the motor controller, and a state of the motor; and controlling the motor controller to output the current to the motor, if the charge/discharge function state of the battery pack, the state of the motor controller, and the state of the motor are all normal.

According to an embodiment of the present disclosure, the method further comprises: controlling the motor controller to stop outputting the current to the motor, if at least one of the charge/discharge function state of the battery pack, the state of the motor controller, and the state of the motor is abnormal.

Embodiments of the first aspect of the present disclosure provides a method for controlling heating of a battery pack. The control method is able to acquire the temperature of the battery pack, and to control the motor controller to output a current to the motor when the temperature of the battery pack is lower than the preset temperature threshold, so as to generate the magnetic field in the motor having the magnetic pole direction consistent with or opposite to the magnetic pole direction of the motor rotor and to enable the motor to maintain the stationary state. In this way, it is realized that when the vehicle is in the stationary state, by controlling the battery pack to actively discharge power to generate heat, the working temperature of the battery pack is improved, thereby tackling the problem of poor working status and low discharge efficiency in the prior technology caused by the low working temperature of the battery pack. Furthermore, the control method of the present disclosure does not require other electrical components, which greatly saves costs.

To achieve the above objectives, embodiments of a second aspect of the present disclosure provides an apparatus for controlling heating of a battery pack. The apparatus comprises: an acquisition module, configured for acquiring a temperature of the battery pack; and a control module, configured for controlling a motor controller to output a current to a motor, if the temperature of the battery pack is lower than a preset temperature threshold, so as to generate a magnetic field in the motor having a magnetic pole direction consistent with or opposite to a magnetic pole direction of a motor rotor and to enable the motor to maintain a stationary state.

According to an embodiment of the present disclosure, the control module is further configured for: controlling the motor controller to stop outputting the current to the motor, if the temperature of the battery pack is equal to or higher than the preset temperature threshold.

According to an embodiment of the present disclosure, the control module is further configured for: acquiring a position of the motor rotor; and controlling the motor controller to output the current to the motor according to the position of the motor rotor.

Embodiments in a second aspect of the present disclosure provides an apparatus for controlling heating of a battery pack. The apparatus is able to acquire the temperature of the battery pack, and to control the motor controller to output a current to the motor when the temperature of the battery pack is lower than the preset temperature threshold, so as to generate the magnetic field in the motor having the magnetic pole direction consistent with or opposite to the magnetic pole direction of the motor rotor and to enable the motor to maintain the stationary state. In this way, it is realized that when the vehicle is in the stationary state, by controlling the battery pack to actively discharge power to generate heat, the working temperature of the battery pack is improved, thereby tackling the problem of poor working status and low discharge efficiency in the prior technology caused by the low working temperature of the battery pack. Furthermore, the control method of the present disclosure does not require other electrical components, which greatly saves costs.

To achieve the above objectives, embodiments of a third aspect of the present disclosure provides a vehicle controller, comprising: the apparatus for controlling heating of the battery pack according to embodiments of the second aspect of the present disclosure.

To achieve the above objectives, embodiments of a fourth aspect of the present disclosure provides a vehicle, comprising the vehicle controller according to embodiments of the third aspect of the present disclosure.

To achieve the above objectives, embodiments of a fifth aspect of the present disclosure provides a computational processing device, comprising:

a memory storing computer readable codes; and at least one processor.

The computational processing device is configured to implement the method for controlling heating of the battery pack according to embodiments of the first aspect, when the computer readable codes are executed by the at least one processor.

To achieve the above objectives, embodiments of a sixth aspect of the present disclosure provides a computer program, comprising computer readable codes, when executed by a computational processing device, cause the computational processing device to implement the method for controlling heating of the battery pack according to the embodiments of the first aspect.

To achieve the above objectives, embodiments of a seventh aspect of the present disclosure provides a non-transitory computer readable storage medium, storing the computer program according to the embodiments of the sixth aspect.

Additional aspects and advantages of the present disclosure will be introduced in the following description, and some of the additional aspect and advantages of the present disclosure will become apparent from the following description, or may be learned by practice of the present disclosure.

BRIEF DESCRIPTION OF THE DRAWINGS

The above and/or additional aspects and advantages of the present disclosure will become apparent and readily understood from the following description of embodiments in conjunction with the accompanying drawings, wherein:

FIG. 1 is a flowchart of a method for controlling heating of a battery pack provided by an embodiment of the present disclosure;

FIG. 2 is a flowchart of another method for controlling heating of a battery pack provided by an embodiment of the present disclosure;

FIG. 5 is a schematic diagram of magnetic poles of a motor winding and a motor rotor in a motor according to an embodiment of the present disclosure;

FIG. 6 is a flowchart of still another method for controlling heating of a battery pack provided by an embodiment of the present disclosure;

FIG. 8 is a schematic structural diagram of an apparatus for controlling heating of a battery pack provided by an embodiment of the present disclosure;

FIG. 9 is a schematic structural diagram of a vehicle controller provided by an embodiment of the present disclosure;

FIG. 10 is a schematic structural diagram of a vehicle provided by an embodiment of the present disclosure;

DETAILED DESCRIPTION OF THE EMBODIMENTS

Figure 3:
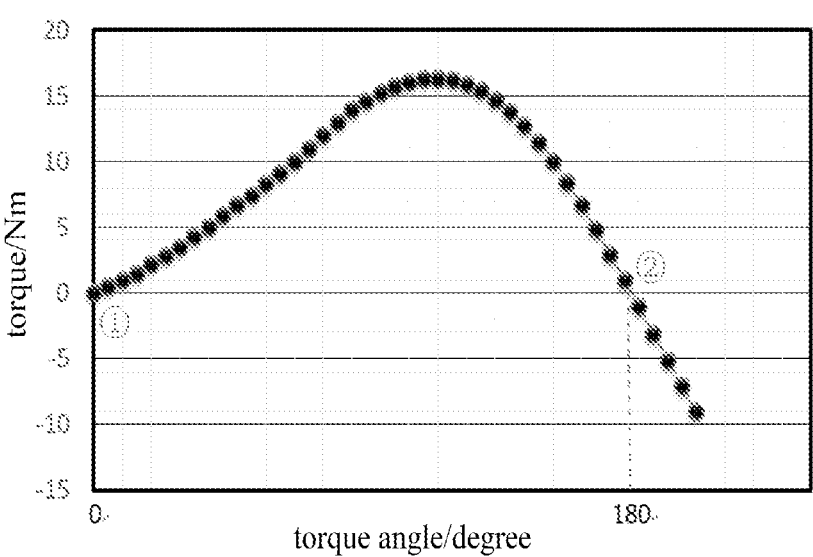
FIG. 3 provides a graph of a motor torque and a torque angle according to an embodiment of the present disclosure.

Embodiments of the present disclosure are described in detail hereinbelow, examples of which are illustrated in the accompanying drawings, in which, the same or similar reference numerals refer to the same or similar elements or elements having the same or similar functions throughout. The embodiments described below with reference to the accompanying drawings are exemplary, and are intended to explain the present disclosure and should not be construed as a limitation of the present disclosure.

The following describes a method and an apparatus for controlling heating of a battery pack according to the embodiments of the present disclosure with reference to the accompanying drawings.

FIG. 1 is a flowchart of a method for controlling heating a battery pack provided by an embodiment of the present disclosure. As shown in FIG. 1, the method for controlling heating a battery pack comprises step S101 and step S102.

In step S101, a temperature of the battery pack is acquired.

It should be understood that some acquisition apparatuses related to temperature information are employed in the method of the present disclosure, for example, temperature sensors. The acquisition apparatuses can acquire a current temperature of the battery pack and report the same to a battery management system (BMS) in real time or periodically, in which, the period can be set according to practical conditions.

The BMS can monitor the temperature of the battery pack in real time, and a vehicle controller can acquire the temperature of the battery pack from the BMS.

It should be understood that the method for controlling the heating of the battery pack provided by the present disclosure may be applied to both pure electric vehicles and hybrid electric vehicles, and both the vehicle control unit for the pure electric vehicles (VCU) and the vehicle control unit for the hybrid electronic vehicles (HCU) can obtain the temperature of the battery pack from the BMS.

In step S102, if the temperature of the battery pack is lower than a preset temperature threshold, a motor controller is controlled to output a current to a motor, so as to generate a magnetic field in the motor having a magnetic pole direction consistent with or opposite to a magnetic pole direction of a motor rotor and to enable the motor to maintain a stationary state.

It should be noted that if the temperature is extremely low, the temperature of the battery pack will be inevitably affected. With the decrease of the temperature of the battery pack, the storage power in the battery pack will be significantly reduced, which will lead to the deterioration of the working status of the battery pack, and in turn decrease the performance of the vehicle and greatly reduce the cruising range of the vehicle when the vehicle starts to drive in a low temperature environment.

Therefore, in the control method of the present disclosure, before the starting of the vehicle, the temperature of the battery pack is acquired and identified, and corresponding instructions are generated according to an identification result and adopted to control the motor control unit. In this way, the temperature of the battery pack is maintained within an allowable range, so as to keep the activity of the battery pack. In the meanwhile, the motor is controlled at a stationary state, to enable the vehicle to maintain a stationary state, such that the vehicle is able to keep relatively high performance even in the low-temperature environment, and the cruising range of the vehicle is ensured.

Optionally, after acquiring the temperature of the battery pack, the vehicle controller is able to compare the temperature of the battery pack with the preset temperature threshold. If it is identified that the temperature of the battery pack is lower than the preset temperature threshold, this means that the current temperature of the battery pack is too low and needs to be increased, then an instruction for heating the battery pack can be sent to the MCU so as to control the MCU to output the current to the motor. If it is identified that the temperature of the battery pack is equal to or higher than the preset temperature threshold, this means that the current temperature of the battery pack is within the allowable range and there is no need to improve the temperature of the battery pack, then the instruction for heating the battery pack may not be sent to the MCU, and in such case, the MCU does not output the current to the motor.

The preset temperature threshold can be set according to practical condition.

It should be understood that when the temperature of the battery pack is lower than the preset temperature threshold, the MCU may be modulated to output the current, so as to generate the magnetic field in the motor having the magnetic pole direction consistent with or opposite to the magnetic pole direction of the motor rotor and to enable the motor to maintain the stationary state.

Therefore, the control method of the present disclosure is able to acquire the temperature of the battery pack, and to control the motor controller to output a current to the motor when the temperature of the battery pack is lower than the preset temperature threshold, so as to generate the magnetic field in the motor having the magnetic pole direction consistent with or opposite to the magnetic pole direction of the motor rotor and to enable the motor to maintain the stationary state. In this way, it is realized that when the vehicle is in the stationary state, by controlling the battery pack to actively discharge power to generate heat, the working temperature of the battery pack is improved, thereby tackling the problem of poor working status and low discharge efficiency in the prior technology caused by the low working temperature of the battery pack. Furthermore, the control method of the present disclosure does not require other electrical components, which greatly saves costs.

Further, after controlling the motor controller to output a current to the motor, so as to generate the magnetic field in the motor having the magnetic pole direction consistent with or opposite to the magnetic pole direction of the motor rotor and to enable the motor to maintain the stationary state. The temperature of the battery pack can be continuously acquired in real time or periodically, and the working status of the MC is dynamically adjusted according to the temperature of the battery pack.

Optionally, after the temperature of the battery pack is reacquired, the reacquired temperature of the battery pack is compared with the preset temperature threshold, if it is identified that the temperature of the battery pack is lower than the preset temperature threshold, this means that the temperature of the battery pack needs to be further improved, and the instruction for heating the battery pack is continued to be sent to the MCU, so as to control the MCU to continuously output the current to the motor. If it is identified that the temperature of the battery pack is equal to or higher than the preset temperature threshold, this means that the current temperature of the battery pack is within the allowable range and there is no need to further improve the temperature of the battery pack, then the instruction for heating the battery pack may be stopped to be sent to the MCU, and in such case, the MCU is controlled to stop outputting the current to the motor.

Therefore, the control method of the present disclosure is able to detect the temperature of the battery pack again, after controlling the MCU to output the current to the motor, and then to control the MCU to stop outputting the current to the motor, when it is identified that the temperature of the battery pack is equal to or higher than the preset temperature threshold. In this way, not only is the intelligence of the method for controlling heating of the battery pack of the present disclosure improved, but also the safety of the battery pack is ensured, which avoids potential safety hazards caused by continuously increasing the temperature of the battery pack.

On the basis of the above embodiments, the process for controlling the MCU to output the current to the motor is further explained in details.

It should be understood that in the present disclosure, when it is tried to control the MCU to output the current to the motor, the position of the motor rotor may be acquired, and the MCU is accurately controlled to output a matching current to the motor according to the position of the motor rotor, such that the magnetic field having the magnetic pole direction consistent with or opposite to the magnetic pole direction of the motor rotor is generated in the motor, and the motor maintains a stationary state.

As a possible implementation manner, as shown in FIG. 2, the method for controlling heating the battery pack specifically comprises steps S201 and S201.

In step S201, a position of the motor rotor is acquired.

It should be noted that, as shown in FIG. 3, it can be seen that only when the angle between the magnetic pole generated by the motor winding and the magnetic pole of the motor rotor is 0° or 180°, the torque of the motor is 0 Nm, and the motor can be ensured to be in a stationary state. Therefore, when trying to achieve the energized state, to enable the motor rotor to remain a stationary state, the magnetic pole of the magnetic field generated when the motor winding is energized must be consistent with or opposite to the magnetic pole generated by the motor rotor, that is, an electrical angle between the two magnetic poles must be 0° or 180°.

The 0° or 180° pointed out here is a comprehensive electrical angle considering a stator inclined slot or a rotor inclined pole of the motor. The angle is based on the direction of the magnetic pole of the motor rotor, and the deviation of the angle between the magnetic pole direction of the motor winding and the magnetic pole direction of the motor rotor is measured.

It should be understood that some acquisition apparatuses related to position information are employed in the method of the present disclosure, for example, Hall sensors. The acquisition apparatuses can acquire the position information and report the same to the MCU in real time or periodically, in which, the period can be set according to practical conditions.

Optionally, the position of the motor rotor (that is, the magnetic pole direction) can be acquired in real time through the Hall elements, and the acquired position of the motor rotor can be reported to the MCU.

In step S202, the motor controller is controlled to output the current to the motor according to the position of the motor rotor.

Figure 4:
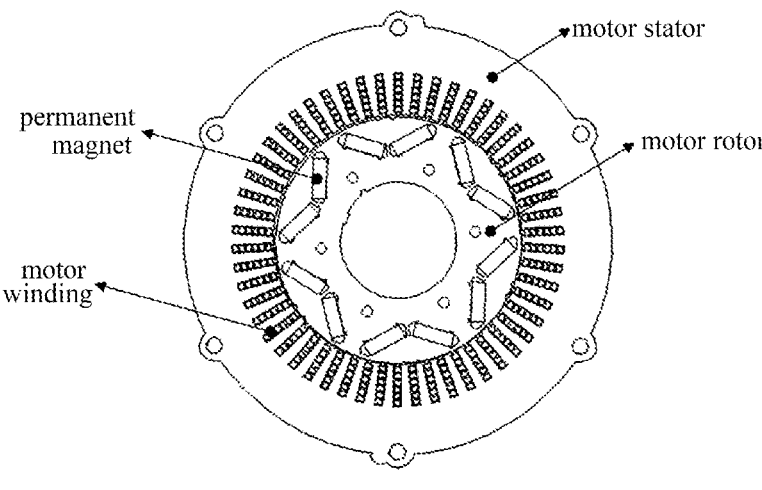
FIG. 4 is a schematic structural diagram of a motor according to an embodiment of the present disclosure.

It should be noted that, as shown in FIG. 4, the motor includes: permanent magnets, a motor winding, a motor stator, and a motor rotor. In a synchronous motor in a normal operation, a three-phase sinusoidal alternating current having a phase angle interval of 120° is introduced into the motor winding to generate a rotating magnetic field in the motor, which in turn drives the motor rotor having a fixed magnetic field to rotate, and finally drives the vehicle forward or backward.

In the present disclosure, as shown in FIG. 5, after the position of the motor rotor is acquired, the MCU can be controlled to output the current to the motor according to the position of the motor rotor. By modulating the output current of the MCU, the three-phase current input to the motor is kept in a DC state, and a magnetic field having the magnetic pole direction consistent with or opposite to the magnetic pole direction of the motor rotor is generated inside the motor, that is, the magnetic pole of the magnetic field and the magnetic pole of the motor rotor are symmetric with each other and have consistent directions, so as to keep the motor stationary while the motor winding is energized.

For example, when the obtained position of the motor rotor is A, the output current of the MCU can be modulated to keep the three-phase current input to the motor in a DC state, and to ensure that the angle between the magnetic pole generated by the motor winding and the magnetic pole of the motor rotor is 0° or 180°.

Therefore, the control method of the present disclosure can obtain the position of the motor rotor when controlling the MCU to output current to the motor, and accurately control the MCU to output a matching current to the motor according to the position of the motor rotor, so as to generate the magnetic field in the motor having the magnetic pole direction consistent with or opposite to the magnetic pole direction of the motor rotor, to ensure that the motor can remain in a stationary state during the process of heating the battery pack, so that when the vehicle is in a stationary state, the battery pack can actively discharges to generate heat, thereby increasing the working temperature of the battery pack, improving the working status and the discharge efficiency of the battery pack.

Further, as shown in FIG. 3, the magnetic poles generated by the motor winding at positions ① and ② in the figure have the same or opposite magnetic pole directions relative to the motor rotor. In such condition, the MCU outputs a current to the motor, and the motor can remain in a stationary state. For position ①, position ① is a magnetization direction, the magnetic pole of the motor winding of the motor is in the same direction as the magnetic pole of the motor rotor, and a slope of the torque-torque angle curve is gentle and positive. For position ②, position ② is a demagnetization direction, and the magnetic pole direction of the motor winding of the motor is opposite to the magnetic pole direction of the motor rotor, the slope of the torque-torque angle curve is relatively steep and negative.

When the magnetic pole generated by the motor winding is at the position ①, when the motor rotor has an unexpected rotation angle deviation due to control accuracy and other reasons, the magnetic pole of the motor winding will deviate from the magnetic pole of the rotor, and the rotor will generate a negative torque to correct the deviation of the rotor position. When the magnetic pole generated by the motor winding is in position ②, a positive torque will be generated and the rotor position deviation will be enlarged.

Therefore, it is safer to work at the magnetization position (that is, position ①). That is to say, when trying to control the MCU output current to the motor according to the position of the motor rotor, the magnetic field having the magnetic pole direction consistent with the magnetic pole direction of the motor rotor generated in the motor by current modulation is significantly safer, compared with the magnetic field having the magnetic pole direction opposite to the magnetic pole direction of the motor rotor generated in the motor by current modulation.

Therefore, the method of the present disclosure can control the MCU to output the current to the motor according to the obtained position of the motor rotor, so as to form a magnetic field in the motor having a magnetic pole direction consistent with the magnetic pole direction of the motor rotor. In this way, the motor can maintain the stationary state during the heating process of the battery pack. Not only can the working temperature of the battery pack be improved by controlling the battery pack to positively discharge power and generate heat during the stationary state of the vehicle, but also the magnetic pole direction of the motor winding can be ensured to be consistent with the magnetic pole of the rotor, thereby improving the safety during the control process of heating the battery pack.

It should be noted that, in order to further ensure the safety during the control process of heating the battery pack, before controlling the MCU to output the current to the motor, the charge/discharge function state of the battery pack, the state of the motor controller, and the state of the motor can be acquired and identified, and the MCU is controlled according to the identification result.

As a possible implementation manner, as shown in FIG. 6, the method for controlling heating the battery pack specifically comprises steps S301-S304.

In step S301, a charge/discharge function state of the battery pack, a state of the motor controller, and a state of the motor are acquired.

In step S302, it is determined whether the charge/discharge function state of the battery pack, the state of the motor controller, and the state of the motor are all normal.

Optionally, in case that the charge/discharge function state of the battery pack, the state of the motor controller, and the state of the motor are all identified to be normal, step S303 is executed. In case that at least one of the charge/discharge function state of the battery pack, the state of the motor controller, and the state of the motor is abnormal, if the MCU is controlled to output the current to the motor, not only can the battery pack not be effectively heated, resulting in energy waste, but also safety hazards may be caused, therefore, step S304 can be executed, during which, the MCU is controlled to stop outputting the current to the motor.

In step S303, the MCU is controlled to output the current to the motor.

Optionally, an instruction for heating the battery pack can be sent to the MCU, so as to control the MCU to output the current to the motor.

In step S304, the MCU is controlled to avoid outputting the current to the motor.

Optionally, an instruction for stopping heating the battery pack can be sent to the MCU, so as to control the MCU to avoid outputting the current to the motor.

Therefore, in the control method of the present disclosure, before controlling the MCU to output the current to the motor, the charge/discharge function state of the battery pack, the state of the motor controller, and the state of the motor are acquired and identified. The MCU is controlled to output the current to the motor, only when it is identified that the charge/discharge function state of the battery pack, the state of the motor controller, and the state of the motor are all normal. In this way, the effectiveness of the process for controlling the heating of the battery pack is ensured, and the safety during the process for controlling the heating of the battery pack is further improved.

Figure 7:
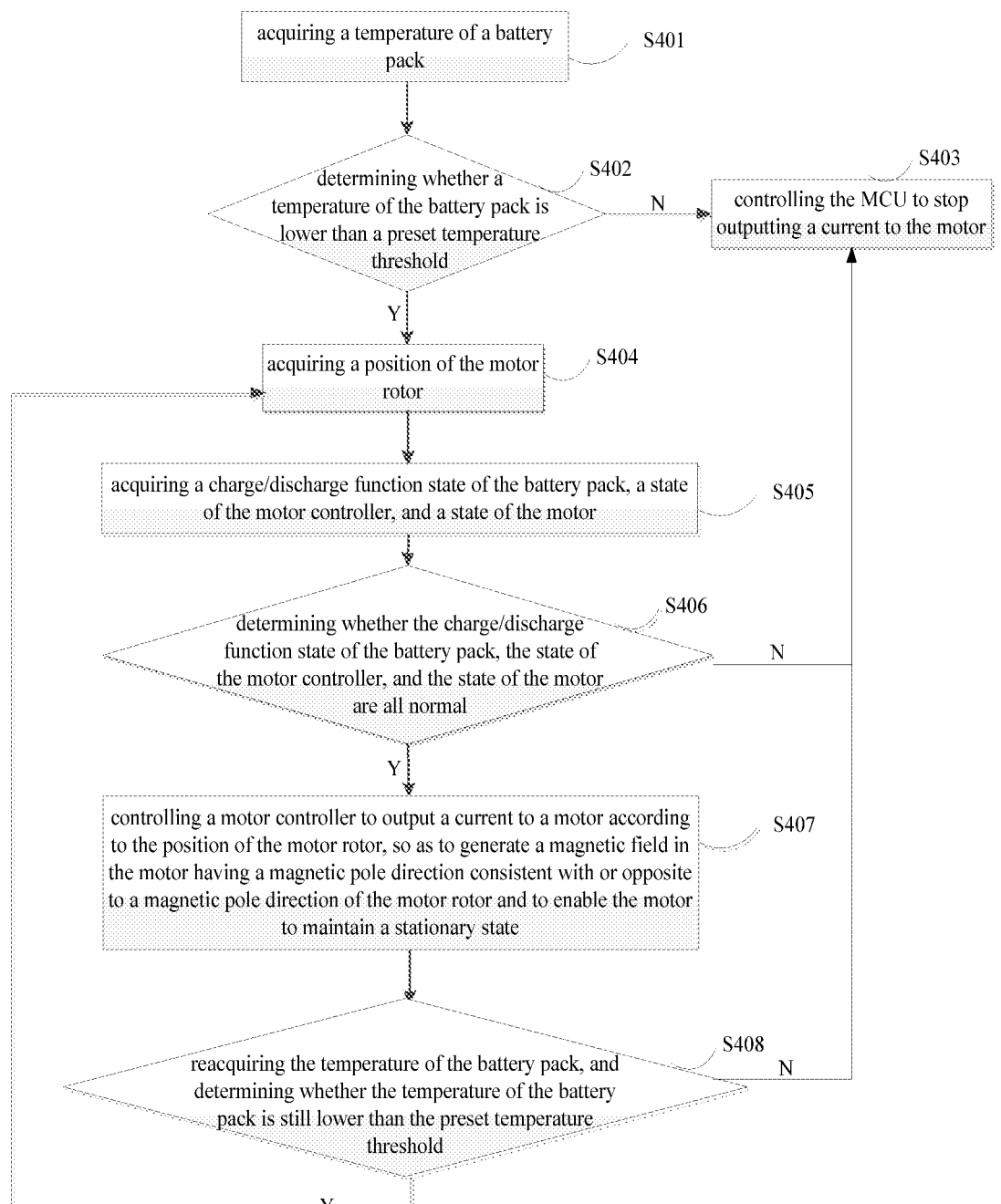
FIG. 7 is a flowchart of still another method for controlling heating of a battery pack provided by an embodiment of the present disclosure.

In order to achieve the above embodiment, as shown in FIG. 7, a flowchart of another method for controlling heating of battery pack is provide by the present disclosure and comprises steps S401-S408:

In step S401, a temperature of a battery pack is acquired.

In step S402, it is determined whether a temperature of the battery pack is lower than a preset temperature threshold.

Optionally, if it is identified that the temperature of the battery pack is lower than the preset temperature threshold, step S404 can be executed. If it is identified that the temperature of the battery pack is equal to or higher than the preset temperature threshold, step S403 can be executed.

In step S403, the MCU is controlled to stop outputting a current to the motor.

In step S404, a position of the motor rotor is acquired.

In step S405, a charge/discharge function state of the battery pack, a state of the motor controller, and a state of the motor are acquired.

In step S406, it is determined whether the charge/discharge function state of the battery pack, the state of the motor controller, and the state of the motor are all normal.

Optionally, if it is identified that the charge/discharge function state of the battery pack, the state of the motor controller, and the state of the motor are all normal, the step S407 can be executed. If it is identified that at least one of the charge/discharge function state of the battery pack, the state of the motor controller, and the state of the motor is abnormal, the step S403 can be executed In step S407, a motor controller is controlled to output a current to a motor according to the position of the motor rotor, so as to generate a magnetic field in the motor having a magnetic pole direction consistent with or opposite to a magnetic pole direction of the motor rotor and to enable the motor to maintain a stationary state.

In step S408, the temperature of the battery pack is reacquired, and it is determined whether the temperature of the battery pack is still lower than the preset temperature threshold.

Optionally, if it is identified that the temperature of the battery pack is still lower than the preset temperature threshold, the step S404 is returned to, and the MCU is controlled to continue output the current to the motor. If it is identified that the temperature of the battery pack is equal to or higher than the preset temperature threshold, the step S403 is executed, and the current is stopped to be output to the motor.

It should be understood that specific details of the step S401-S408 may be referred to related records in the above embodiments, and will not be repeated herein.

Therefore, the control method of the present disclosure is able to acquire the temperature of the battery pack, and to control the motor controller to output a current to the motor when the temperature of the battery pack is lower than the preset temperature threshold, so as to generate the magnetic field in the motor having the magnetic pole direction consistent with or opposite to the magnetic pole direction of the motor rotor and to enable the motor to maintain the stationary state. In this way, it is realized that when the vehicle is in the stationary state, by controlling the battery pack to actively discharge power to generate heat, the working temperature of the battery pack is improved, thereby tackling the problem of poor working status and low discharge efficiency in the prior technology caused by the low working temperature of the battery pack. Furthermore, the control method of the present disclosure does not require other electrical components, which greatly saves costs.

To achieve the above embodiment, the present disclosure further provides an apparatus for controlling heating of a battery pack.

FIG. 8 is a structural schematic diagram of an apparatus for controlling heating of a battery pack according to an embodiment of the present disclosure. As shown in FIG. 8, the apparatus 100 for controlling heating of a battery pack comprises: an acquisition module 11 and a control module 12.

The acquisition module 11 is configured for acquiring a temperature of the battery pack. The control module 12 is configured for controlling a motor controller to output a current to a motor, if the temperature of the battery pack is lower than a preset temperature threshold, so as to generate a magnetic field in the motor having a magnetic pole direction consistent with or opposite to a magnetic pole direction of a motor rotor and to enable the motor to maintain a stationary state.

Furthermore, the control module is further configured for: controlling the motor controller to stop outputting the current to the motor, if the temperature of the battery pack is equal to or higher than the preset temperature threshold.

Furthermore, the control module is further configured for: acquiring a position of the motor rotor; and controlling the motor controller to output the current to the motor according to the position of the motor rotor.

It should be understood that the description and explanation of embodiments related to the above control method for heating the battery pack are also applicable for the control apparatus for heating the battery pack in this embodiment, which will therefore not be repeated herein.

Therefore, the control apparatus of the present disclosure is able to acquire the temperature of the battery pack, and to control the motor controller to output a current to the motor when the temperature of the battery pack is lower than the preset temperature threshold, so as to generate the magnetic field in the motor having the magnetic pole direction consistent with or opposite to the magnetic pole direction of the motor rotor and to enable the motor to maintain the stationary state. In this way, it is realized that when the vehicle is in the stationary state, by controlling the battery pack to actively discharge power to generate heat, the working temperature of the battery pack is improved, thereby tackling the problem of poor working status and low discharge efficiency in the prior technology caused by the low working temperature of the battery pack. Furthermore, the control method of the present disclosure does not require other electrical components, which greatly saves costs.

To achieve the above embodiments, the present disclosure further provides a vehicle controller 200, as shown in FIG. 9, The vehicle controller 200 comprises the apparatus 100 for controlling heating of a battery pack, in order to achieve the method for controlling heating of a battery pack.

To achieve the above embodiments, the present disclosure further provides a vehicle 400, as shown in FIG. 10, The vehicle 400 comprises the vehicle controller 200, in order to achieve the method for controlling heating of a battery pack.

To achieve the above embodiments, the present disclosure further provides computational processing device, comprising:

a memory storing computer readable codes; and at least one processor. The computational processing device is configured to implement the method for controlling heating of the battery pack as described in the above, when the computer readable codes are executed by the at least one processor.

To achieve the above embodiments, the present disclosure further provides a computer program, comprising computer readable codes, when executed by a computational processing device, cause the computational processing device to implement the method for controlling heating of the battery pack as described in the above.

To achieve the above embodiments, the present disclosure further provides a non-transitory computer readable storage medium, storing the computer program as described in the above.

Figure 11:
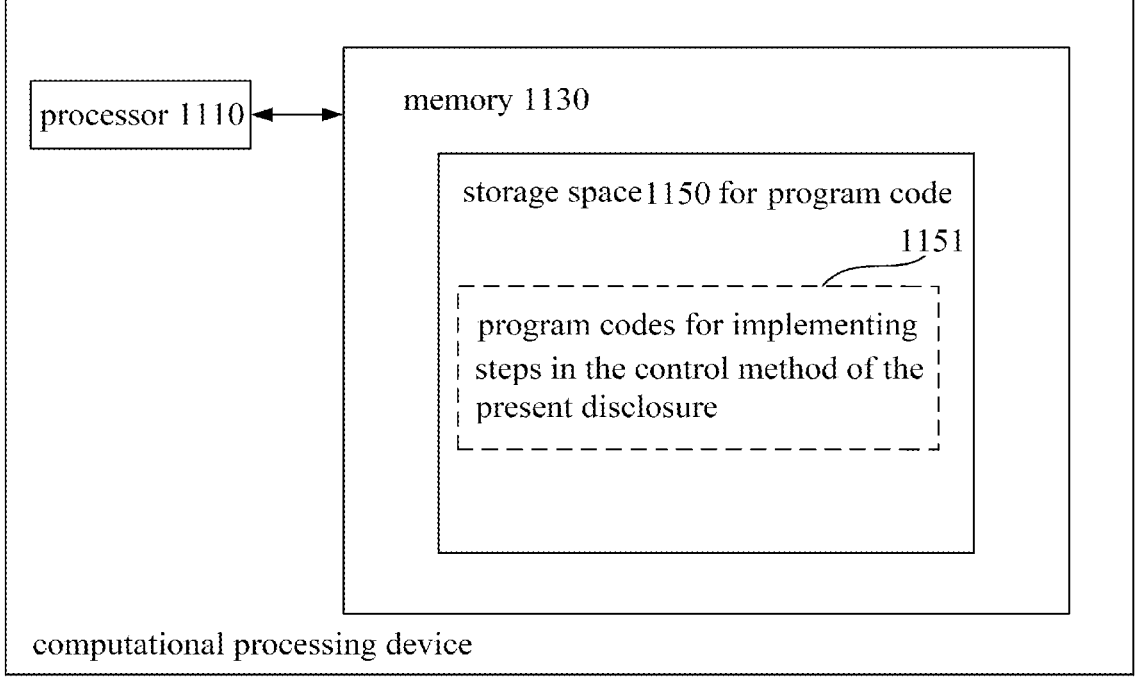
FIG. 11 is a schematic structural diagram of a computational processing device provided by an embodiment of the present disclosure.
Figure 12:
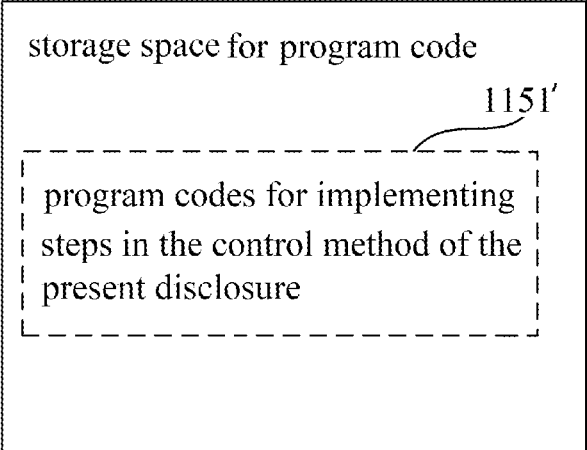
FIG. 12 is a schematic structural diagram of portable or fixed storage unit for storing a program code configured for implementing the method according to the present disclosure according to an embodiment of the present disclosure.

FIG. 11 provides a schematic structural diagram of a computational processing device according to an embodiment of the present disclosure. The computational processing device typically includes a processor 1110 and a computer program product or computer readable medium in the form of a memory 1130. The memory 1130 may be an electronic memory, such as a flash memory, an electrically erasable programmable read only memory (EEPROM), EPROM, hard disk, or ROM. The memory 1130 has a storage space 1150 for a program code 1151 for performing any of the method steps in the above-described methods. For example, the storage space 1150 for the program code may include various program codes 1151 for implementing various steps in the above methods, respectively. The program codes can be read from or written to one or more computer program products. These computer program products include program code carriers such as hard disks, compact disks (CDs), memory cards or floppy disks. Such computer program products are typically portable or fixed storage units as shown in FIG. 12. The storage unit may have storage segments, storage spaces, etc. arranged similarly to the memory 1130 in the computational processing device of FIG. 11. The program code may, for example, be compressed in a suitable form. Typically, the storage unit includes a computer readable code 1151', that is, a code readable by a processor such as 1110, for example, which, when executed by a computational processing device, causes the computational processing device to perform any of the method steps in the above described methods.

In the description of the specification, description with reference to the terms "one embodiment", "some embodiments", "example", "specific example", or "some examples", etc., mean specific features, structures, materials, or features described in connection with the embodiment or example are included in at least one embodiment or example of the present disclosure. In this specification, schematic representations of the above terms are not necessarily directed to the same embodiment or example. Furthermore, the particular features, structures, materials, or features described may be combined in any suitable manner in any one or more embodiments or examples. Furthermore, those skilled in the art may combine different embodiments or examples described in this specification, as well as the features of the different embodiments or examples, without conflicting each other.

In addition, the terms "first" and "second" are only used for descriptive purposes, and should not be construed as indicating or implying relative importance or implying the number of indicated technical features. Thus, a feature defined with "first", "second" may expressly or implicitly include at least one of that feature. In the description of the present disclosure, "plurality" means at least two, such as two, three, etc., unless expressly and specifically defined otherwise.

Any process or method description in the flowcharts or otherwise described herein may be understood to represent a module, segment, or portion of code comprising one or more executable instructions for implementing custom logical functions or steps of the process. The scope of the preferred embodiments of the present disclosure includes alternative implementations in which the functions may be performed out of the order shown or discussed, including performing the involved functions substantially concurrently or in the reverse order, depending upon the functions involved, this may be understood by those skilled in the art to which the embodiments of the present disclosure pertain.

The logic and/or steps represented in flowcharts or otherwise described herein, for example, may be considered an ordered listing of executable instructions for implementing the logical functions, and may be embodied in any computer readable medium, for use with, or in conjunction with, an instruction execution system, apparatus, or device (such as a computer-based system, a system including a processor, or other system that can fetch instructions from and execute instructions from an instruction execution system, apparatus, or device). For the purposes of this specification, a "computer-readable medium" can be any device that can contain, store, communicate, propagate, or transport the program for use by or in conjunction with an instruction execution system, apparatus, or device. More specific examples (non-exhaustive list) of computer readable media include the following: electrical connections with one or more wiring (electronic devices), portable computer disk cartridges (magnetic devices), random access memory (RAM), read only memory (ROM), erasable editable read only memory (EPROM or Flash Memory), fiber optic devices, and portable compact disc read only memory (CDROM). In addition, the computer readable medium may even be paper or other suitable medium on which the program may be printed, as the paper or other medium may be optically scanned, for example, followed by editing, interpretation, or processed by other suitable manner if necessary so as to obtain the program electronically and then the program is stored in computer memory.

It should be understood that portions of the present disclosure may be implemented in hardware, software, firmware, or a combination thereof. In the above described embodiments, various steps or methods may be implemented in software or firmware stored in memory and executed by a suitable instruction execution system. For example, if the implementation in hardware is the same as the implementation manner in another embodiment, any one of the following techniques known in the art or any combination thereof can be adopted: discrete logic circuits with logic gates for implementing logic functions on data signals, application-specific integrated circuits with suitable combinational logic gates, programmable gate array (PGA), and field programmable gate arrays (FPGA) etc.

Those skilled in the art can understand that all or part of the steps included in the methods of the above embodiments can be completed by instructing the relevant hardware through a program, and the program can be stored in a computer-readable storage medium. When the program is executed, one or a combination of the steps of the method embodiment is implemented.

In addition, functional units in embodiments of the present disclosure may be integrated into one processing module, or each unit may exist physically alone, or two or more units may be integrated into one module. The above-mentioned integrated modules can be implemented in the form of hardware, and can also be implemented in the form of software function modules. If the integrated modules are implemented in the form of software functional modules and sold or used as independent products, the integrated modules may also be stored in a computer-readable storage medium.

The above-mentioned storage medium may be a read-only memory, a magnetic disk, an optical disk, and the like, although the embodiments of the present disclosure have been shown and described above, it should be understood that the above-mentioned embodiments are exemplary and should not be construed as limiting the present disclosure. Variations, modifications, substitutions, and alterations to the above-described embodiments may be made by those of ordinary skill in the art within the scope of the present disclosure.

What is claimed is:

1. A method for controlling heating a battery pack, being applied to a vehicle controller of a vehicle, before starting of the vehicle, the method comprising following operations:

acquiring a temperature of the battery pack from a battery management system;

sending an instruction of heating the battery pack to a motor controller to control the motor controller to output a matching current to a motor if the temperature of the battery pack is lower than a preset temperature threshold, so as to generate a magnetic field in the motor having a magnetic pole direction consistent with or opposite to a magnetic pole direction of a motor rotor and to enable the motor to maintain a stationary state; and controlling the battery pack to actively discharge to generate heat when the vehicle is in the stationary state; wherein the operation of sending the instruction of heating the battery pack to the motor controller to control the motor controller to output the matching current to the motor comprises:

acquiring a position of the motor rotor; and controlling the motor controller to output the matching current to the motor according to the position of the motor rotor;

wherein the operation of controlling the motor controller to output the matching current to the motor according to the position of the motor rotor comprises:

modulating an output current of the motor controller to enable a three-phase current input to the motor to be in a direct current state and ensure that an angle between a magnetic pole generated by the motor winding when it is energized and a magnetic pole generated by the motor rotor is 0° or 180°;

wherein after the operation of controlling the motor controller to output the matching current to the motor according to the position of the motor rotor, the method further comprises:

reacquiring the temperature of the battery pack in real time or periodically;

comparing the reacquired temperature of the battery pack with the preset temperature threshold; and returning to perform the operation of sending the instruction of heating the battery pack to the motor controller to control the motor controller to output the matching current to the motor, if the temperature of the reacquired battery pack is lower than the preset temperature threshold.

2. The method of claim 1, further comprising:

controlling the motor controller to stop outputting the current to the motor, if the temperature of the battery pack is equal to or higher than the preset temperature threshold.

3. The method of claim 1, further comprising:

acquiring a charge/discharge function state of the battery pack, a state of the motor controller, and a state of the motor; and controlling the motor controller to output the current to the motor, if the charge/discharge function state of the battery pack, the state of the motor controller, and the state of the motor are all normal.

4. The method of claim 3, further comprising:

controlling the motor controller to stop outputting the current to the motor, if at least one of the charge/discharge function state of the battery pack, the state of the motor controller, and the state of the motor is abnormal.

5. The method of claim 1, wherein the operation of acquiring a position of the motor rotor comprises:

acquiring the position of the motor rotor in real time through Hall elements and reporting the acquired position of the motor rotor to the motor controller.

6. The method of claim 2, wherein the operation of controlling the motor controller to stop outputting the matching current to the motor comprises:

sending an instruction of stopping heating the battery back to the motor controller to control the motor controller to stop outputting the matching current to the motor.

* * * * *